Figure 1:
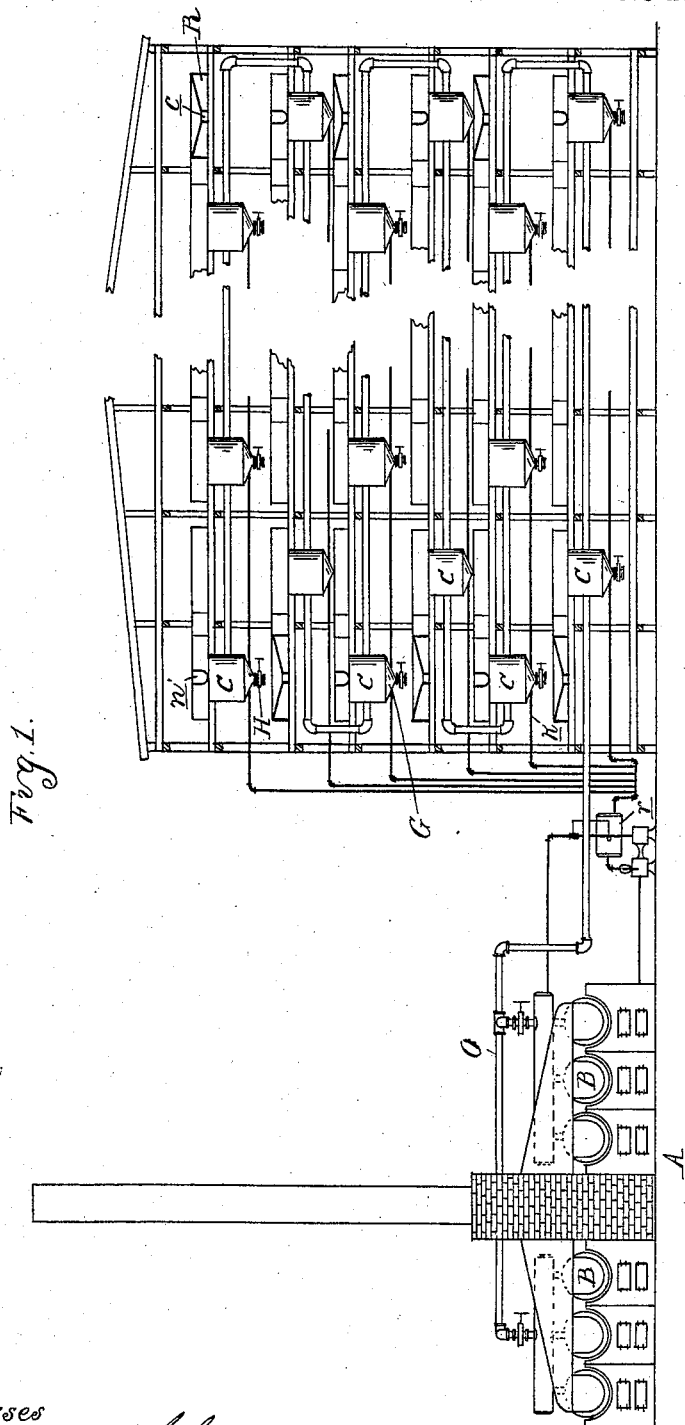

(No Model.) 4 Sheets—Sheet 1.

T. CRANEY.
SALT MAKING APPARATUS.

No. 605,082. Patented June 7, 1898.

Witnesses
Inventor
Thomas Craney (No Model.) 4 Sheets—Sheet 2.
T. CRANEY.
SALT MAKING APPARATUS.
No. 605,082. Patented June 7, 1898.
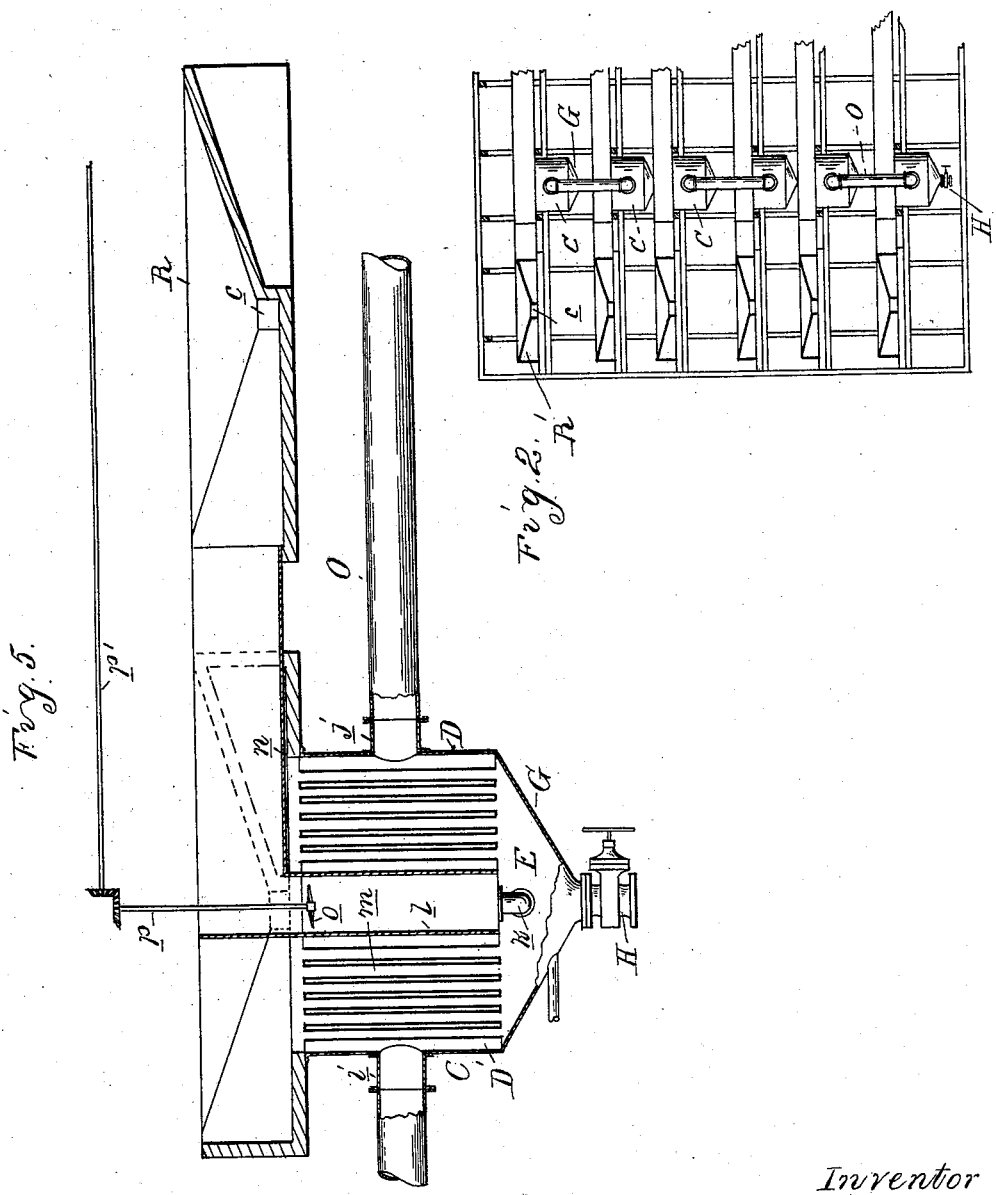
Witnesses
Otto F. Barthel
W. D. Dogherty
Inventor
Thomas Craney
By Thos. A. Sprague & Son
Atty's.

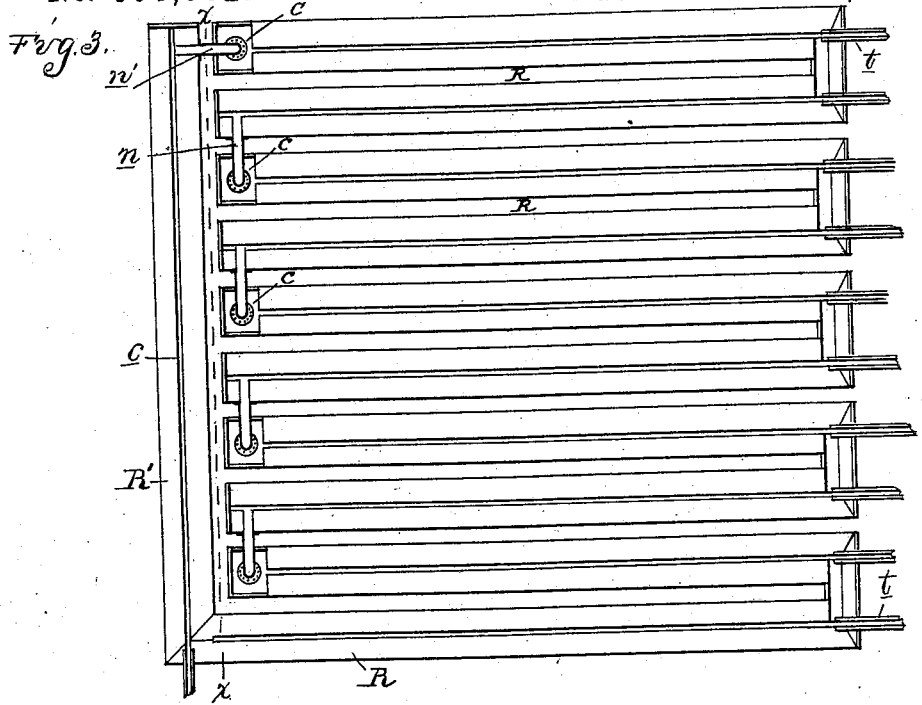
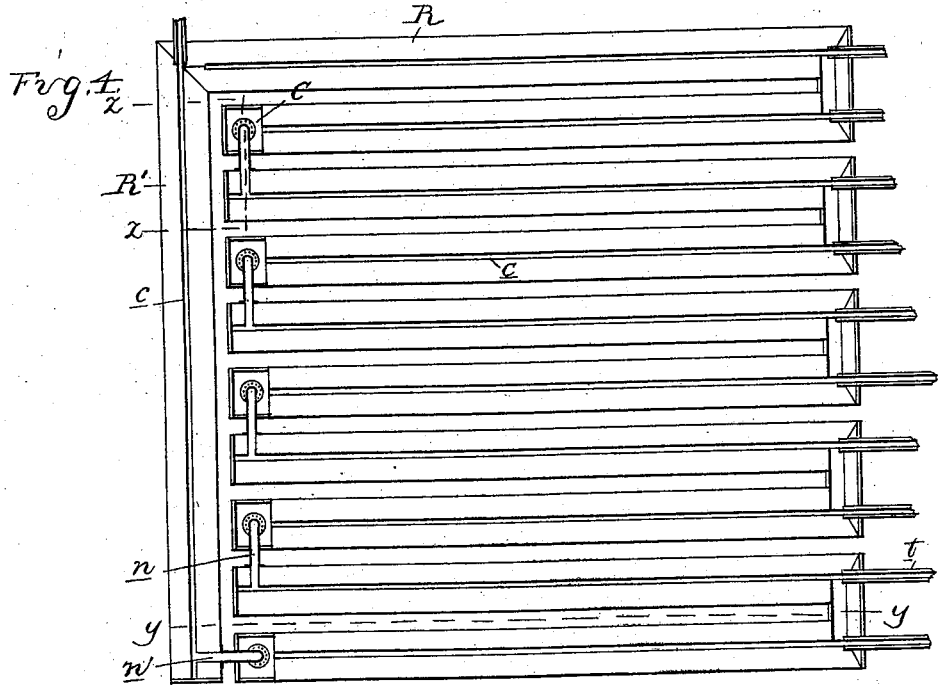

(No Model.) 4 Sheets—Sheet 4.
T. CRANEY.
SALT MAKING APPARATUS.
No. 605,082. Patented June 7, 1898.
Fig. 6.
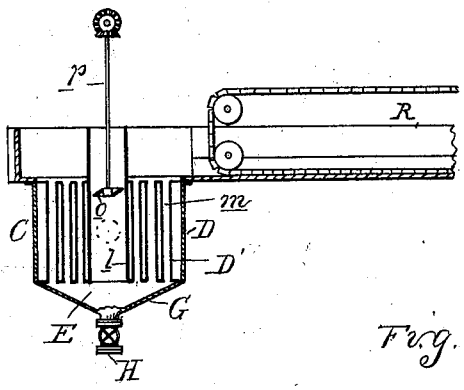
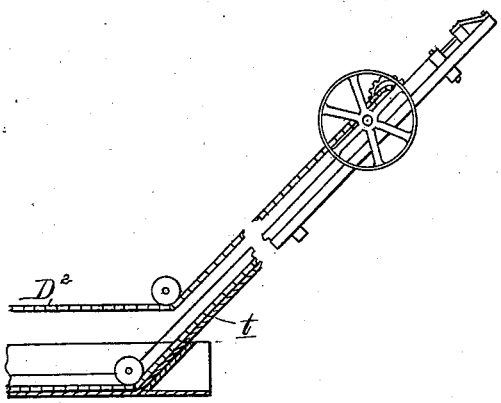
Fig. 7.
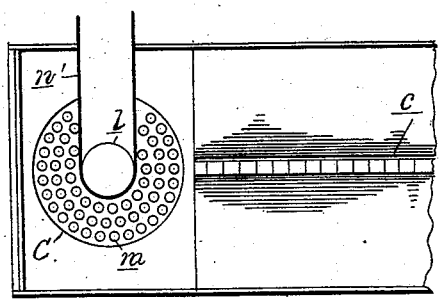
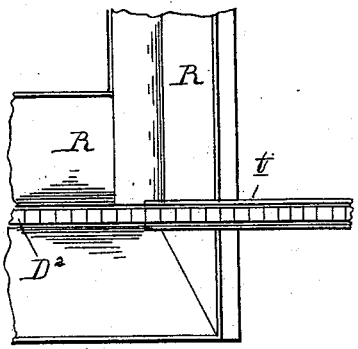
Witnesses
Otto F. Barthet
H. M. Dougherty
Inventor
Thomas Craney
By Thos. S. Preguesson
Attys.

UNITED STATES PATENT OFFICE.

THOMAS CRANEY, OF BAY CITY, MICHIGAN.

SALT-MAKING APPARATUS.

SPECIFICATION forming part of Letters Patent No. 605,082, dated June 7, 1898.

Application filed August 1, 1896. Serial No. 601,384. (No model.)

*To all whom it may concern:*

Be it known that I, THOMAS CRANEY, a citizen of the United States, residing at Bay City, in the county of Bay and State of Michigan, have invented certain new and useful Improvements in Apparatus for Making Salt from Brine, of which the following is a specification, reference being had therein to the accompanying drawings.

This invention relates to an improved plant for manufacturing salt from salt brine by the process of evaporation in open vats or so-called "grainers" by the aid of steam heat; and the object of my invention is to make salt on a more economical scale than at present, and, further, to enable the manufacturer to produce different grades of salt as the market may demand, and, further, to manufacture salt under circumstances under which it has not been possible or profitable heretofore to manufacture it at all.

To this end the invention consists in the peculiar construction, arrangement, and operation of the apparatus, all as more fully hereinafter described, and shown in the drawings, in which—

Figure 1 shows a sectional front elevation in which my apparatus is shown as embodied in a six-story plant. Fig. 2 is a sectional side elevation. Figs. 3 and 4 are plans of the alternate stories, the lines $x \, x$ and $y \, y$ thereon indicating substantially the planes on which Figs. 1 and 2 are respectively taken. Fig. 5 is an enlarged section, in a vertical plane, through the axis of one of the heaters on line $z \, z$ in Fig. 4. Fig. 6 is an enlarged vertical section through one of the heaters at right angles to the plane in Fig. 5 and showing in connection therewith the scraper for removing the salt from the grainer. Fig. 7 is a plan of Fig. 5.

In the drawings, A represents the boiler-house; B, the boilers for generating the steam required to run the plant; O, the main steam-pipe, and C the heaters in which the steam is used for evaporating the salt brine.

The salt-making apparatus is shown inclosed in a separate simple frame structure containing a number of floors, each of which supports a salt-making apparatus of the character specially devised by me for the purpose and forming an independently-working unit of the plant. This unit is constructed and arranged as follows: The whole floor-space is practically covered with a peculiarly-formed evaporating-pan of large superficial area, and composed of a series of loops R, extending horizontally, each representing substantially a wooden salt-grainer, as in present use, except that it is preferably made of flat V-shaped cross-section and formed in the center with a longitudinal groove $c$, the slope being of sufficient incline to cause the crystals of salt to collect in the groove, in which a scraper operates to remove them, as will be more fully described hereinafter.

Each grainer-loop is provided in one end with a steam-heater C, which consists of a cylindrical outer shell D, divided by horizontal partitions into an upper steam-chamber D' and lower brine-chamber E, the latter being formed with a conical bottom G, provided with a bottom discharge-orifice controlled by a valve H. The steam-space of this heater is provided with steam inlets and outlets $i \, j$, respectively, arranged on opposite sides, and an outlet $k$ is provided from the bottom of the steam-space to carry away the water of condensation.

The brine-chamber communicates into the bottom of the grainer through a system of vertical circulating-pipes $m$, and an inflow-pipe $l$ leads vertically down through the center of the heater into the brine-chamber.

Each grainer is formed at its initial end with a flat bottom of sufficient extent to attach the heater thereto and form a small well around the top of the heater, the bottom of the well being substantially on a level with the bottom of the groove. The heaters are adapted to heat and circulate the brine throughout the whole system of grainers on each floor, and to this end the first loop is connected by a conduit $n$ directly with the top of the inflow-pipe $l$ in the heater of the second loop, affording thus a direct horizontal passage for the brine from the first loop into the second heater, thence through the brine-chamber up by way of the smaller flues $m$ into the second grainer-loop. The end of the second loop is connected in like manner with the heater in the third loop, and so on, and, finally, the end of the last loop is provided with an extension R', which runs in front of all the loops and terminates opposite the starting-point of the first loop, where it is connected by a conduit $n'$ in the same manner as described between the loops. In this way a continuous circuit is formed for the free circulation of the brine through all the grainers, the brine being compelled to pass successively through each of the heaters, which impart the necessary heat for evaporation. To compel the brine to flow and circulate faster, if desired, an impelling device is preferably provided in the inflow-pipe of each heater.

As shown in the drawings, the impelling devices consist of small screw-propellers $o$, fixed at the ends of vertical shafts $p$, which are driven from a common shaft $p'$, arranged overhead.

Each floor of the building is practically equipped with the same apparatus, and the heaters are supplied with suitable connections with the main steam-pipe, preferably by connecting them in series with each other, as shown, and the water of condensation from the different heaters is collected into a receiver $r$, from which it may be pumped back into the boilers as needed for the generation of steam.

For the sake of economy in the height required for the different stories I preferably place the heaters in the opposite ends of the grainer-loops on each alternate floor and connect the grainers in reverse order, as shown in Figs. 3 and 4.

A scraping device is provided in each branch of the grainer, which consists of an endless chain $D^2$, provided at short intervals with scraper-blades and suitably mounted above the grainers, whereby the lower run of the chain passes longitudinally through the groove $c$ to collect the salt and carry it up an inclined runway $t$, from which it may be dumped into suitable bins.

The preferable way in which I intend to operate my plant is to feed the brine as fast as required into the return extension $R'$ of the last grainer on each floor, with the circulation so arranged that the brine is carried from there into the heater of the first loop, being compelled by the joint action of the heater as well as by the mechanical impelling devices employed to pass first through the heater and thence through the loop to which it is connected, and so on in succession through all the heaters and loops, to be returned again by way of the return extension $R'$. The steam is conducted successively first through the heaters on the first floor and thence into the second-floor heaters, and so on to the heaters of the last floor; but I do not intend to confine myself to such an arrangement, as it is obvious that in order to obtain other desired results the distribution of the steam and the feeding of the brine may be arranged differently.

It will be seen that considering the enormous capacity for evaporating brine my apparatus is very economical in floor-space, as it practically utilizes the whole space on each floor, and the different stories may be made as low as convenient for ordinary purposes, as the heaters are entirely out of the way of each other if the floors are alternately arranged, as in Figs. 3 and 4. Further, the heating apparatus is all nested at one end of the building close to its source of heat, and the distribution of steam is thus effected most economically. It will also further be seen that my system of heating the brine dispenses with the objectionable feature of the grainer system which heretofore required an enormous extent of steam-piping in direct contact with the brine, which not only affected the color of the salt injuriously, but also limited that system to moderate dimensions, thus making the manufacture of salt less profitable. It also enables me to take all the water of condensation back to the boiler in a heated condition.

One of the most important advantages which I have gained with my improved apparatus is that the manufacturer is now enabled to produce with the same plant a greater number of different grades of salt than can be obtained with the ordinary grainer system, as it will be well understood that the amount of heat units imparted to the lowest story will be greatest and less in each succeeding floor, the top floor receiving the least. Thus the evaporation on the ground floor will take place much faster than on the next floor above, and gradually less toward the top floor, and directly resulting from this the salt on the lowest floor will be relatively of the finest grade, while that on the top floor will be of the coarsest grade, and as the salt is separately collected on each floor there will be a distinct and uniform grade on each floor to supply the trade with.

As the source of the heat—that is, the quantity of steam—may be itself controlled, according to the need of steam, the degree of evaporation in the different floors is so within the control of the manufacturer that he can produce any grade of salt which the market may demand, which makes my salt plant much more elastic and of commercial profit than plants heretofore in use and which were mostly limited by the nature of their construction and operation to one grade of salt, with a result that if there was no market for that grade it had to be shut down.

My grainers are of simple and inexpensive construction and provide for a large evaporating-surface in proportion to the amount of brine, and a heater of my description is much less liable to discolor the salt or have its heating-surface impaired by incrustation than the old heating-coils, and any sediment which may collect can be readily removed through the valves H.

The impelling device forms a means for accelerating the heating of the brine by circulating the brine faster than it would by the heater alone. The latter, however, produces a strong circulation for itself, as the numerous small pipes surrounding the single center tube heat the brine much faster, and thus cause it to flow down the center tube and up the small tubes into the well, to which the heater is connected, and as no steam can escape while the brine is thus circulating through the heater no salt will be precipitated in the heater or in the well around it, while on the other hand the sulfate of lime, which is the most common impurity of salt brine, becomes insoluble by the heating of the brine and is deposited mostly in the well around the heater and can thus be readily removed, and the salt obtained is thus that much purer.

What I claim as my invention is—

1. In an apparatus for manufacturing salt from brine, the combination of a horizontally-extending grainer, a circulating-heater depending from the under side at one end of said grainer and communicating with the bottom thereof, an open return-conduit entering through the walls of the grainer to a point above the heater, a vertical inflow-pipe connecting the end of said conduit with the bottom of the heater and a mechanical device for impelling the brine in said inflow-pipe.

2. In an apparatus for making salt from brine, the combination of a horizontally-extending grainer, a heater contained within an outer shell secured to the under side at one end of the grainer, and containing an upper heating-chamber a lower brine-chamber, a series of outflow-pipes from the brine-chamber into the bottom of the grainer through the heating-chamber, a return-conduit from the grainer with the end to which the heater is attached and an inflow-pipe communicating therewith and extending down through the heater into the brine-chamber.

3. In an apparatus for making salt from brine, the combination of a horizontally-extending grainer, a heater depending from the bottom at one end of the grainer and comprising a cylindrical outer shell formed with diaphragms dividing the shell into an upper and lower chamber means for supplying the upper chamber with steam, a system of vertical circulating-pipes from the lower chamber communicating with the bottom of the grainer, a vertical inflow-pipe for the lower chamber centrally of the heater and a horizontal open return-conduit communicating with said inflow-pipe.

4. In an apparatus for manufacturing salt from brine, the combination of a horizontally-extending grainer, a cylindrical vessel attached to the under side at one end of the grainer and formed with a conical bottom having a valve-controlled discharge-opening, diaphragms dividing the vessel into a lower brine-chamber and an upper steam-chamber provided with means for admitting steam thereto, an inflow-pipe for the brine-chamber centrally of the heater and extending into the grainer, an open return-conduit leading from the grainer into the end to which the heater is connected and communicating with the inflow-pipe and a series of vertical circulating-pipes from the brine-chamber through the heating-chamber into the bottom of the grainer.

5. In an apparatus for manufacturing salt from brine, the combination of a series of horizontally-extending loop-shaped grainers grouped side by side upon a common floor and with the last grainer extended into proximity to the first grainer and provided with a supply of fresh brine, a heater in one end of each grainer provided with a circulating system of pipes and passages connected in circuit with the adjacent grainer for heating the brine and circulating it through all the grainers, a source of steam supplying the heaters with steam and a system of scrapers operating to remove the granulated salt from the grainers.

6. A plant for manufacturing salt from brine, comprising a plurality of circulating systems of grainers supported one above the other and on different floors of a building, each system being composed of a series of loop-shaped grainers grouped side by side and provided with means for removing the granulated salt, the last grainer being extended into proximity to the first grainer of the series and connected to the source of brine-supply, each grainer being provided in one end with a circulating steam-heater depending from the under side of the grainer, said heaters connecting the grainers into a closed system for heating and circulating the brine therein, the arrangement being such that the heaters are all nested in one and the same end on each floor contiguous to a common source of steam while the scraper devices operate all toward the opposite end to remove and collect the granulated salt separately on each floor.

In testimony whereof I affix my signature in presence of two witnesses.

THOMAS CRANEY.

Witnesses:
M. B. O'DOGHERTY,
OTTO F. BARTHEL.